3,108,875
PROCESS FOR PRODUCING SWEETENED CONDENSED CREAM
Raymond W. Bell, Washington, D.C., assignor to the United States of America as represented by the Secretary of Agriculture
No Drawing. Filed Mar. 22, 1962, Ser. No. 182,724
4 Claims. (Cl. 99—55)
(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This invention relates to a process for preparing sweetened condensed cream and has among its objects the retention in the product of the emulsifying properties of the fresh cream from which the fat in the product was derived.

High-fat milk products such as butter, frozen cream, and plastic cream are not as satisfactory as fresh cream as sources of fat in ice cream. Changes take place during their manufacture and storage which adversely affect the whipping properties of the mix and the melt down of the ice cream.

One of the most significant changes that occurs in the manufacture of high-fat milk products is the loss of emulsifying properties because emulsifying agents in the natural fat globule membrane, in particular the lecithin-protein complex, are removed or disrupted. For example, when cream is churned, the membrane is physically removed from the fat globules and becomes a part of the buttermilk, leaving only a small portion in the butter. Freezing and thawing of cream and plastic cream nullifies most of the effectiveness of the lecithin-protein complex as an emulsifier in products such as ice cream and other frozen desserts.

Another factor associated with the decreased emulsion stability of a cream product is the increase in the ratio of fat to milk solids-not-fat (MSNF). Whole milk (fat about 3.9%, MSNF 8.9%) can be concentrated in a vacuum pan, as in the preparation of sweetened condensed milk or evaporated milk, with little destabilization of the emulsion in spite of continued vigorous agitation. In contrast, the emulsion of light cream (18% fat, MSNF 7.4%) is relatively unstable to high heat treatment and sterile cream manufacturers have found it necessary to add an edible stabilizer. While centrifuging, especially of cold milk, removes only a minor part of the total fat globule membrane from the fat globules during the separation of cream, increasing the ratio of fat to MSNF lowers the emulsion stability of the cream product. The sensitivity of the emulsion of a heavy cream or of 35% cream to which sucrose has been added in the amount of 80% of the fat, is illustrated by the following procedure:

(a) Weigh 9 grams of the product into a 50%—9 gram Babcock cream test bottle, add 9 ml. of water at 120° F., mix thoroughly, add 120° F. water up to the top part of the graduated portion of the neck, mix by shaking the bottle with a finger over the top, and then centrifuge at 120° F. for 5 minutes in a machine of the type used for determining fat in milk and cream by the Babcock method. At the end of the centrifuging period the depth of the layer of fat in the neck of the bottle will not be clearly defined. This condition can be remedied by leaving the bottle overnight at 40° F., rewarming the contents to 120° F. and recentrifuging as before. The amount of fat in the neck of the bottle is usually less than 5% of the fat in the 9 gram sample of sweetened cream or heavy cream.

(b) Hold either of the above products overnight at 40° F. or concentrate some of the same cream-sucrose mixture in an evaporator of conventional design, such as the batch type, take a sample within a short time after active boiling begins, and examine by the procedure just described. Most of the fat in the 9 gram portion is present in the neck of the test bottle.

Heretofore the most satisfactory method of preparing a stable sweetened cream product was to blend, with a minimum of agitation and with avoidance of other emulsion-weakening factors, a high fat content cream with sucrose and MSNF. The additional MSNF assists in stabilizating the emulsion.

I have discovered that a cream-sucrose mixture can be concentrated successfully in a vacuum evaporator in which the mixture moves as a falling film over a heated surface. Considering the results previously obtained with a batch type vacuum pan and other conventional evaporators, it is most surprising that the removal of water in the new process is accomplished with a minimum of adverse effect upon the emulsion stability of the product, which is a stable sweetened condensed cream of substantially the same composition and physical properties, including emulsion stability, as that obtainable by the blending process.

In general, according to the present invention, milk is separated, as in any commercial cream separator, to produce a cream having a fat content in the range of about 20 to 40%, sucrose is combined with the cream in proportions so that the sweetened condensed cream product has a sucrose-in-water content of about 60 to 65%, the sucrose-cream mixture (sweetened cream) is heated to about 200° F. for about 15 to 25 seconds, and the hot sweetened cream is concentrated in a falling film under a vacuum to evaporate water with a minimum of agitation of the sweetened cream, thereby concentrating the sweetened cream without substantially destabilizing the emulsion, and producing a stable sweetened condensed cream product.

In a preferred evaporator the hot sweetened cream enters vertically located tubes, which are surrounded by a heating medium, such as steam under reduced pressure, and proceeds downward by gravitational flow. With the vaporizing chamber under a high vacuum, for example, 28 to 29 inches of mercury vacuum, the sweetened cream instantly forms a dense mist or cloud and its temperature drops to that temperature at which water boils at the reduced pressure (vacuum) in the evaporator, and water in the droplets evaporates. The higher the vacuum, within practical limits, the better the capacity for evaporation. Additional water is caused to vaporize from the sweetened cream by contact of the film of liquid with the heated surfaces, such as those in a vertical tubular calandria or steam chest. Means should be provided for controlling not only the degree of vacuum in the chamber, but also the temperature of the heating medium over the length of the heating surfaces so that the rate of vaporization of water in the sweetened cream can be regulated and any tendency of the product to coat on the heating surface can be minimized.

During the downward passage of the film and mist of sweetened cream more and more water will evaporate and the water vapors are withdrawn through a liquid-vapor separator to a condenser. The concentrated sweetened cream collects in the liquid-vapor separating chamber and is withdrawn from the evaporator system by means of a rotary positive pump, subjecting the concentrate (sweetened condensed cream) to a minimum of agitation. The concentrate is preferably withdrawn to an evacuated container, or a container having an atmosphere inert to the product, and the product is adjusted to the desired composition. If too much water has been evaporated, the concentrate is diluted with potable water; if not enough water has been removed the concentrate is recycled.

As an alternative, the sweetened cream may be concentrated in a double effect evaporator, the heating medium for the esecond effect being the vapors from the first effect.

The sweetened condensed cream having the desired composition is withdrawn from the system and packaged under conditions designed to avoid contamination, particularly from molds, and incorporation of air.

The following example is presented as a typical illustration of the process of the present invention, but is not intended to be in limitation thereof.

*Example 1*

Milk was held for 15 seconds in a heat exchanger at 180° F., then regeneratively cooled to 130–140° F., and separated to obtain cream containing 35% fat. To 100 lbs. of this cream was added 27.2 lbs. of sucrose, an amount such that the final product, sweetened condensed cream, of 41.1% fat content would contain approximately 62.0% sucrose-in-water. The sucrose was dissolved in the warm cream with no more than moderate agitation, and the sweetened cream then quickly heated to 200° F. and delivered in a continuous stream to the evaporator, the time in transit being 15 to 25 seconds. The evaporator was a single pass non-agitating, falling film type. It was connected to a source (steam jet ejectors) providing about 29 inches of vacuum, and had a calandria heated by vacuum steam (180° F. more or less). The flow rate of the sweetened cream and the heat provided to the metal surfaces were adjusted so that the product was concentrated to slightly more than 41% fat content in less than one minute. The concentrated sweetened cream was withdrawn continuously from the evaporator by means of a rotary positive pump and packaged with a minimum of agitation, contamination and reincorporation of air. The packages, usually metal cans, were sealed and stored. The packaged sweetened condensed cream remained stable for several months, even when stored at room temperatures.

Separation of cold (about 50° F.) milk in conventional centrifugal type separators produces a more viscous cream and the skim milk is less inclined to foam than when milk is separated while warm (90° F. or above). More of the fat globule membrane remains with the fat and thus more of the lecithin-protein complex goes into the cream during cold milk separation than during warm milk separation. From an emulsifying standpoint this is desirable and it should be understood that, as an alternative, cold raw milk separation may be practiced. In this event, steps should be taken to prevent bacterial growth and hydrolysis of the lipid constituents of the cream until the lipases have been inactivated and the bacteria killed, as they would be in a preliminary heat treatment at a temperature in the range of about 160° to 190° F. for about 15 seconds, an embodiment of which is demonstrated in Example 1.

Whenever economically advantageous, liquid sugar (prepared from sucrose or corn sugar, or a mixture of the two) can be used instead of crystalline sucrose in the process. The sucrose combined with the separated cream is an amount calculated to give a sucrose-in-water percentage in the final product of about 60 to 65, a concentration sufficiently high to produce an osmotic pressure of such magnitude that bacteria will not grow.

Since sweetened condensed cream will support surface mold growth as long as sufficient oxygen for their needs is available, and the temperature is favorable, it is necessary to guard against mold contamination after the final heat treatment. This can be done by keeping the sweetened cream in a mold-free closed system, and filling and covering or closing the final container in an atmosphere of steam or by otherwise protecting the product from contamination.

Special care should be exercised to reduce all agitation to a minimum and otherwise preserve the stability of the emulsion. In order to avoid cooling and holding either the cream or the cream-sugar mixture, all processing should be completed without delay, and, in any event, on the day it is started.

By adjusting the rate of flow of the sweetened cream into the vacuum system, the temperature of the heating medium, the degree of vacuum, and the rate of pumping the concentrate from the evaporator, the sweetened cream can be reduced in volume to a product of the desired composition and the concentrating step completed in a minute or two without materially destabilizing the emulsion.

A particular advantage of the new process over the previous method of preparing a sweetened condensed cream by blending a high-fat cream (50 to 80% fat) with sucrose and MSNF is that in the inventive process all the MSNF in the final product is originally present in the cream which is concentrated. It is thus inherent in the latter process that the steps of preparing and dispersing additional MSNF have been obviated and that the product is more homogeneous than that obtained heretofore.

The presence of air, especially the presence of oxygen, in the packaged product is undesirable. Another advantage of the new process over the blend method is that the product is thoroughly deaerated during the vacuum evaporation of water. Thus the deaeration step is obviated.

Obviously a free-flowing sweetened condensed cream is desirable from a processing and handling standpoint. But it should not be so fluid that stratification of solids will develop during the commercial life of the product. Many factors affect this tendency such as the composition of the sweetened condensed cream and the temperature of storage.

Composition and viscosity objectives for the sweetened condensed cream can be achieved by suitable formulation. While cream with a fat content of about 20 to 40% may be used in the process, a preferred cream will contain 30 to 40% fat. For example, a 30% fat content cream also contains about 6.3% MSNF and 63.7% water. On combining 100 lbs. of this cream with 24.5 lbs. sucrose and concentrating the mixture to 40% fat content the composition of the sweetened condensed cream is 40% fat, 32% sucrose, 19.6% water and 8.4% MSNF. A product of this composition may have a viscosity of only 1,000 centipoises at 70° F. During storage at room temperature fat will rise towards the surface and a milky layer will form in the bottom portion. In order to adhere to this composition and storage temperature, homogenization of the cream may be indicated. In this event either the milk or the cream should be pasteurized. Only a moderate pressure such as 500 to 1,000 p.s.i. single stage, or 500–500 p.s.i. double stage, usually will suffice to obtain the desired viscosity in the sweetened condensed cream.

The manufacturer may decide to increase the viscosity of the product by increasing the percentage of MSNF. A 25% fat content cream contains about 6.8% MSNF and 68.2% water. Combining 19 lbs. of sucrose with 100 lbs. of the 25% fat cream and concentrating to 40% fat content results in a sweetened condensed cream containing 40% fat, 30% sucrose, 19.3% water, and 10.7% MSNF. While lactose crystallization will occur in a product containing this amount of water and MSNF, the rate of crystallization can be greatly accelerated and small, non-gritty crystals formed by suitable cooling and stirring as practiced in the manufacture of sweetened condensed milk.

It will be obvious that there are certain economic advantages in making a sweetened condensed cream that contains, for example, 50% fat, 27% sucrose, 16.3% water and 6.7% MSNF. This product can be prepared by combining 22 lbs. of sucrose with 100 lbs. of 40% fat content cream (5.4% MSNF) and concentrating to a fat content of 50%.

While the general type of evaporator, that is, a falling film, non-agitating vacuum evaporator, is a critical feature in operation of the inventive process, the evaporator is not limited to that of any particular manufacturer, but may vary in construction details which various manufacturers have found to be advantageous.

Heating the sweetened cream for only a short time, about 15 to 25 seconds, at a temperature of about 200° F. with a minimum of agitation does not appear to appreciably detract from the emulsion stability of the sweetened cream. The heat treatment pasteurizes the sweetened cream, while entrance into the evaporator at this temperature facilitates the rapid vaporization of water from the sweetened cream which is immediately cooled thereby.

Sweetened condensed cream prepared by the process of this invention is as satisfactory a source of fat in an ice cream mix as fresh cream. The whipping properties of the mix and the melt-down of the ice cream are essentially the same. By ice cream is meant not only the hard product, but also the soft frozen desserts dispensed directly from the freezer.

I claim:

1. A process for preparing sweetened condensed cream comprising separating milk to produce cream having a fat content in the range of about 20 to 40%, combining said cream with sucrose to produce a sweetened cream, the amount of sucrose combined with the cream being that which will obtain in said sweetened condensed cream a sucrose-in-water percentage of about from 60 to 65, heating the sweetened cream to about 200° F. for about 15 to 25 seconds, continuously passing the hot sweetened cream as a falling film over a heated surface under vacuum conditions to evaporate water and deaerate with a minimum of agitation of the sweetened cream, thereby concentrating the sweetened cream without substantially destabilizing the emulsion and producing a stable sweetened condensed cream.

2. A process for preparing sweetened condensed cream comprising separating milk to produce cream having a fat content in the range of about 20 to 40%, combining said cream with sucrose to produce a sweetened cream, the amount of sucrose combined with the cream being that which will obtain in said sweetened condensed cream a sucrose-in-water percentage of about from 60 to 65, heating the sweetened cream to about 200° F. for about 15 to 25 seconds, continuously passing the hot sweetened cream as a falling film over a heated surface under vacuum conditions to evaporate water and deaerate with a minimum of agitation of the sweetened cream, thereby concentrating the sweetened cream without substantially destabilizing the emulsion and producing a stable sweetened condensed cream, and packaging the stable sweetened condensed cream.

3. A process for preparing sweetened condensed cream comprising heating milk at a temperature in the range of about 150 to 190° F. for about 15 seconds, cooling the heated milk to a temperature below about 140° F., separating the milk to produce a cream having a fat content in the range of about 20 to 40%, combining cream and sucrose to produce a sweetened cream, the amount of sucrose combined with the cream being that which will obtain in said sweetened condensed cream a sucrose-in-water percentage of about from 60 to 65, heating the sweetened cream to about 200° F. for about 15 to 25 seconds, continuously passing the hot sweetened cream as a falling film over a heated surface under vacuum conditions to evaporate water and deaerate with a minimum of agitation of the sweetened cream, thereby concentrating the sweetened cream without substantially destabilizing the emulsion and producing a stable sweetened condensed cream.

4. A process for preparing sweetened condensed cream comprising heating milk at a temperature in the range of about 160 to 190° F. for about 15 seconds, cooling the heated milk to a temperature below about 140° F., separating the milk to produce a cream having a fat content in the range of about 20 to 40%, combining cream and sucrose to produce a sweetened cream, the amount of sucrose combined with the cream being that which will obtain in said sweetened condensed cream a sucrose-in-water percentage of about from 60 to 65, heating the sweetened cream to about 200° F. for about 15 to 25 seconds, continuously passing the hot sweetened cream as a falling film over a heated surface under vacuum conditions to evaporate water and deaerate with a minimum of agitation of the sweetened cream, thereby concentrating the sweetened cream without substantially destabilizing the emulsion and producing a stable sweetened condensed cream, and packaging the stable sweetened condensed cream.

References Cited in the file of this patent

UNITED STATES PATENTS

| | | |
|---|---|---|
| 2,565,085 | Peebles | Aug. 21, 1951 |
| 2,959,485 | Bell et al. | Nov. 8, 1960 |
| 2,981,626 | Tamsma | Apr. 25, 1961 |